(12) United States Patent
Vogel et al.

(10) Patent No.: US 10,262,170 B2
(45) Date of Patent: Apr. 16, 2019

(54) TAG CARRIERS AND ASSEMBLIES FOR RFID TAGS

(71) Applicant: Wolff Industries, Inc., Spartanburg, SC (US)

(72) Inventors: David Vogel, Columbus, IN (US); Walker Newell, Elizabethtown, IN (US)

(73) Assignee: Wolff Industries, Inc., Spartanburg, SC (US)

( * ) Notice: Subject to any disclaimer, the term of this patent is extended or adjusted under 35 U.S.C. 154(b) by 0 days.

(21) Appl. No.: 15/974,114

(22) Filed: May 8, 2018

(65) Prior Publication Data

US 2018/0253575 A1 Sep. 6, 2018

Related U.S. Application Data

(62) Division of application No. 15/254,062, filed on Sep. 1, 2016, now Pat. No. 9,996,718.

(60) Provisional application No. 62/213,808, filed on Sep. 3, 2015.

(51) Int. Cl.

| G06K 19/077 | (2006.01) |
|---|---|
| G06K 7/10 | (2006.01) |
| G08B 13/24 | (2006.01) |
| G06K 19/07 | (2006.01) |

(52) U.S. Cl.
CPC ....... *G06K 7/10366* (2013.01); *G06K 19/077* (2013.01); *G06K 19/0708* (2013.01); *G06K 19/07745* (2013.01); *G06K 19/07747* (2013.01); *G06K 19/07749* (2013.01); *G06K 19/07794* (2013.01); *G08B 13/2434* (2013.01)

(58) Field of Classification Search
CPC .... G06K 19/005; G06K 19/04; G06K 19/041; G06K 19/077; G06K 19/07728; G06K 19/07745; G06K 19/07747; G06K 19/07749; G08B 13/2402; G08B 13/2405; G08B 13/2428; G08B 13/2434
See application file for complete search history.

(56) References Cited

U.S. PATENT DOCUMENTS

| 8,870,078 | B2 | 10/2014 | Webb et al. |
|---|---|---|---|
| 2007/0159336 | A1 | 7/2007 | Tethrake et al. |
| 2011/0024182 | A1 | 2/2011 | Taskila et al. |
| 2011/0139877 | A1 | 6/2011 | Szakelyhidi et al. |
| 2013/0140367 | A1 | 6/2013 | Binmore |
| 2013/0200159 | A1* | 8/2013 | Webb .................... G06K 19/04 235/492 |
| 2016/0140432 | A1 | 5/2016 | Lehovetzki |

OTHER PUBLICATIONS

Wolff Industries, Inc.: International Patent Application No. PCT/US2016/049825 International Search Report dated Nov. 7, 2016 (5 pages).

* cited by examiner

*Primary Examiner* — Andrew W Bee
(74) *Attorney, Agent, or Firm* — Dority & Manning, P.A.

(57) ABSTRACT

Carriers and carrier assemblies for use in apparatus, such as tools, are provided. A carrier assembly generally includes a carrier and an RFID tag which may be coupled to the carrier. The carrier assembly may be inserted at least partially into a bore in an apparatus and removably coupled to the apparatus at least partially within the bore. The carrier may advantageously increase the range at which RFID signals transmitted to and/or from the RFID tag may be detected, either by the RFID tag or an RFID reader.

13 Claims, 6 Drawing Sheets

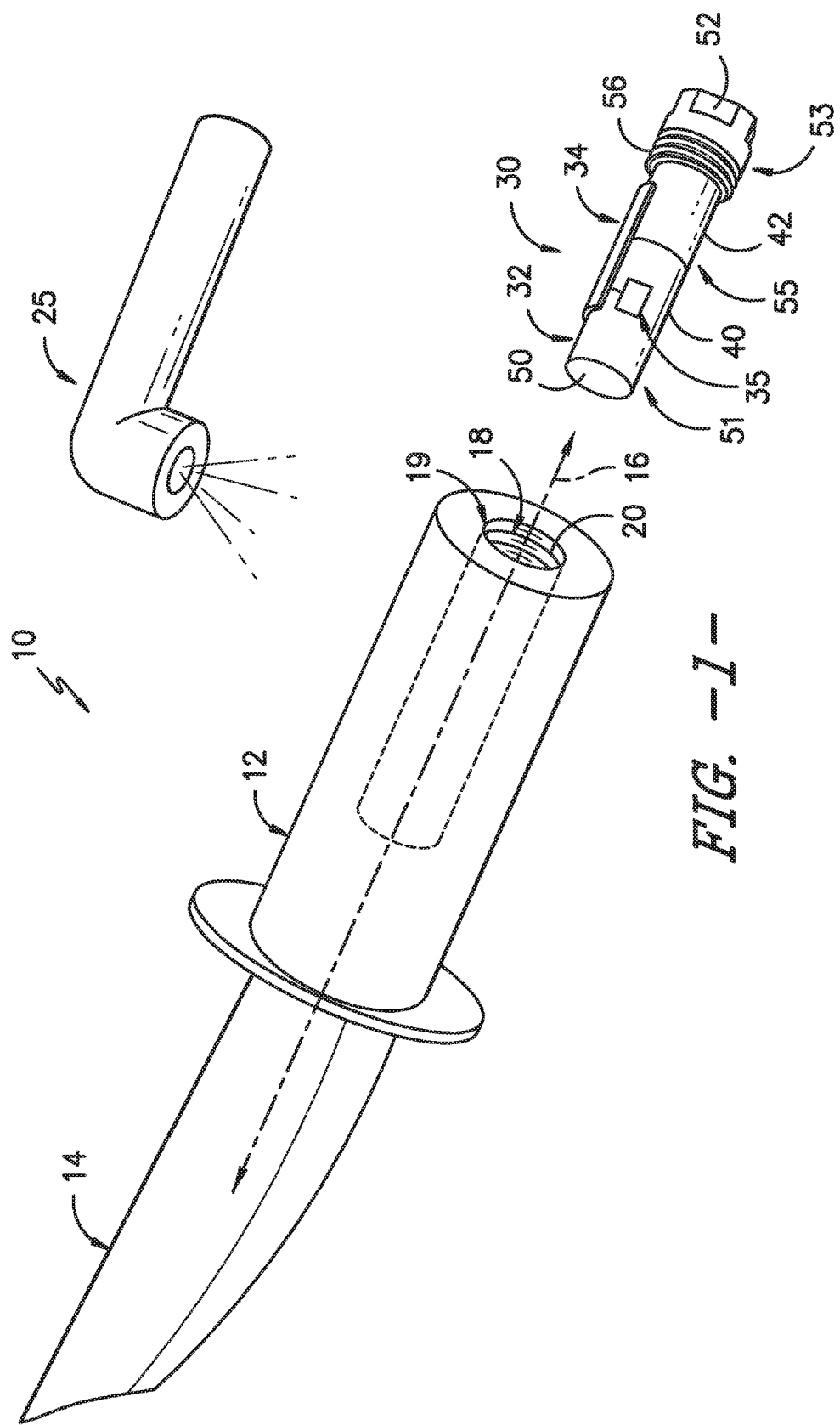
FIG. -1-

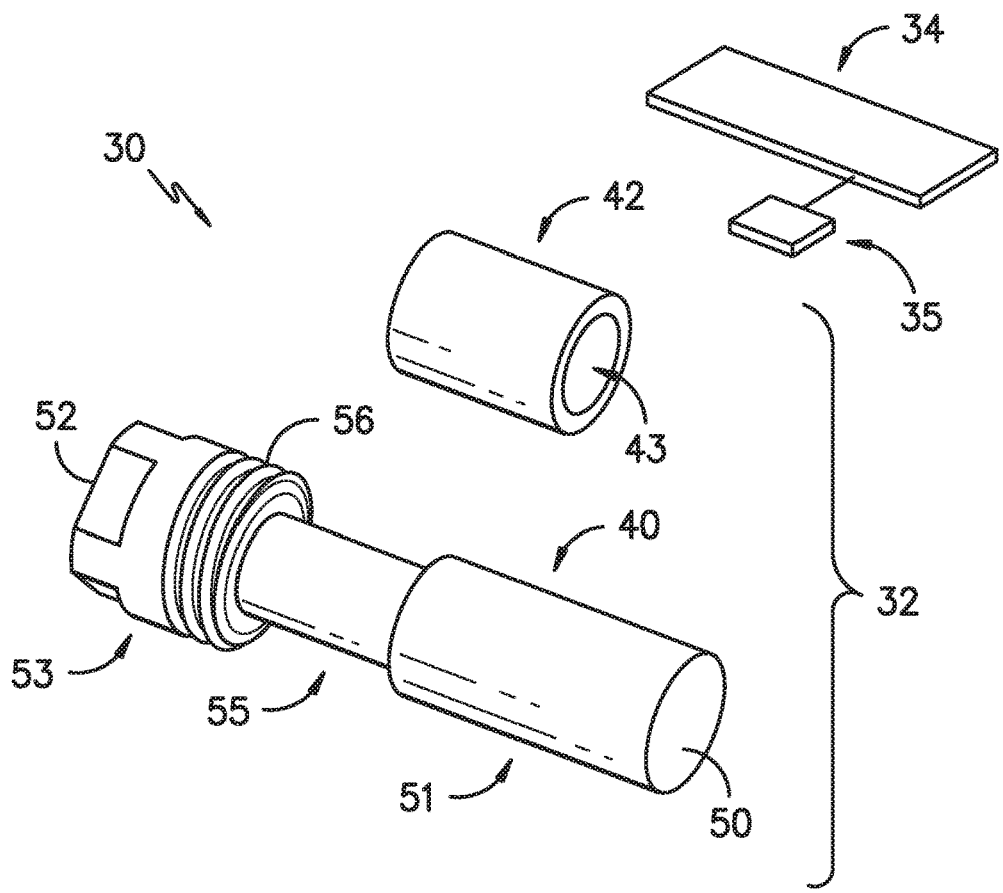
FIG. -2-
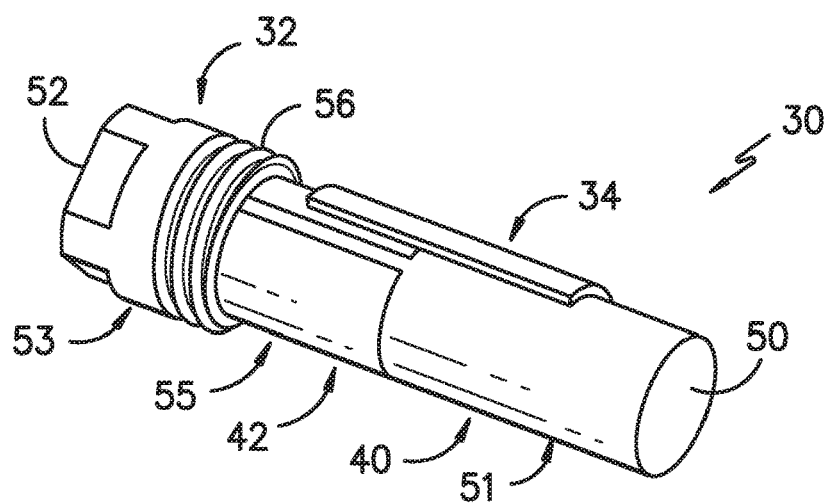
FIG. -3-

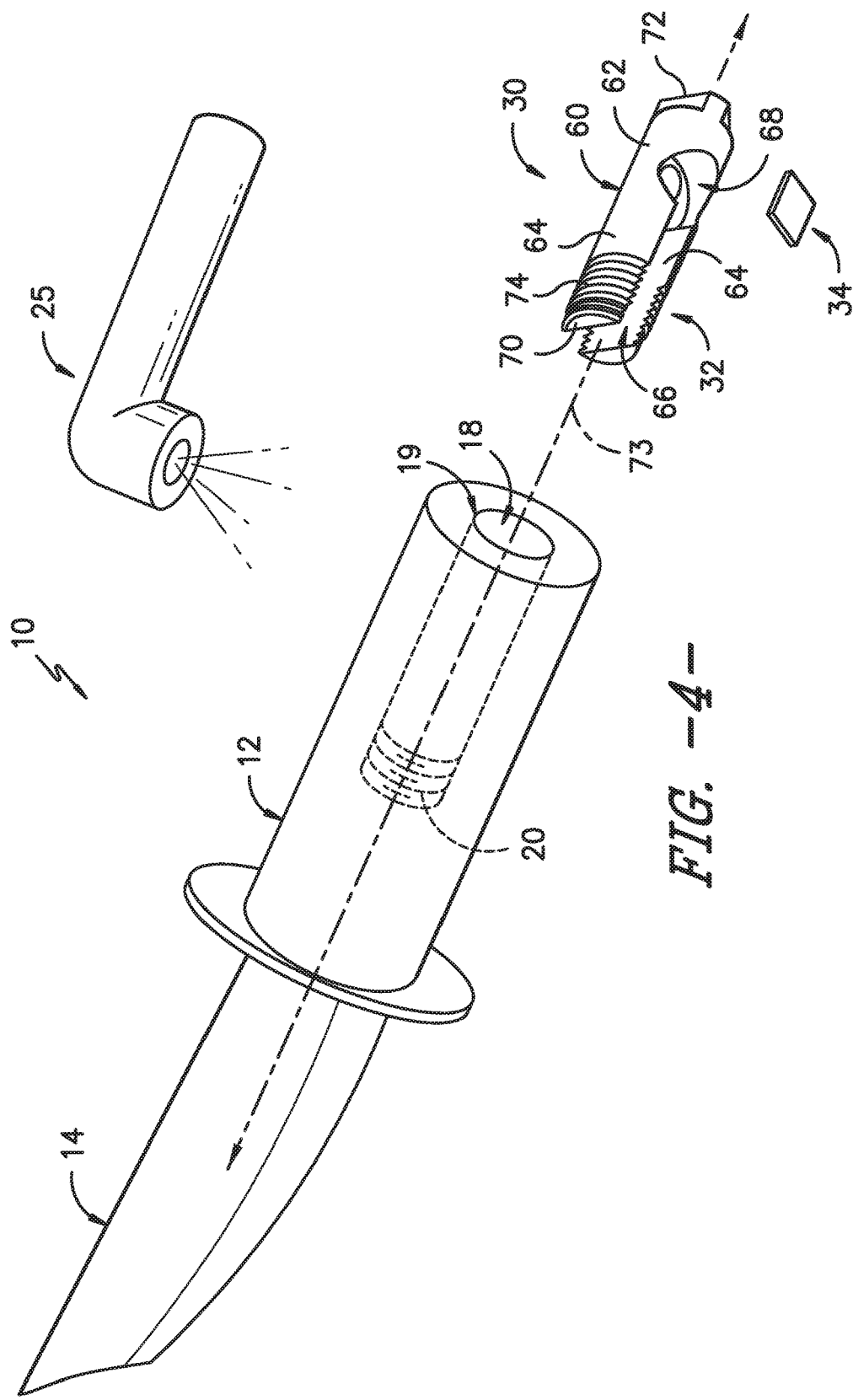
FIG. -4-

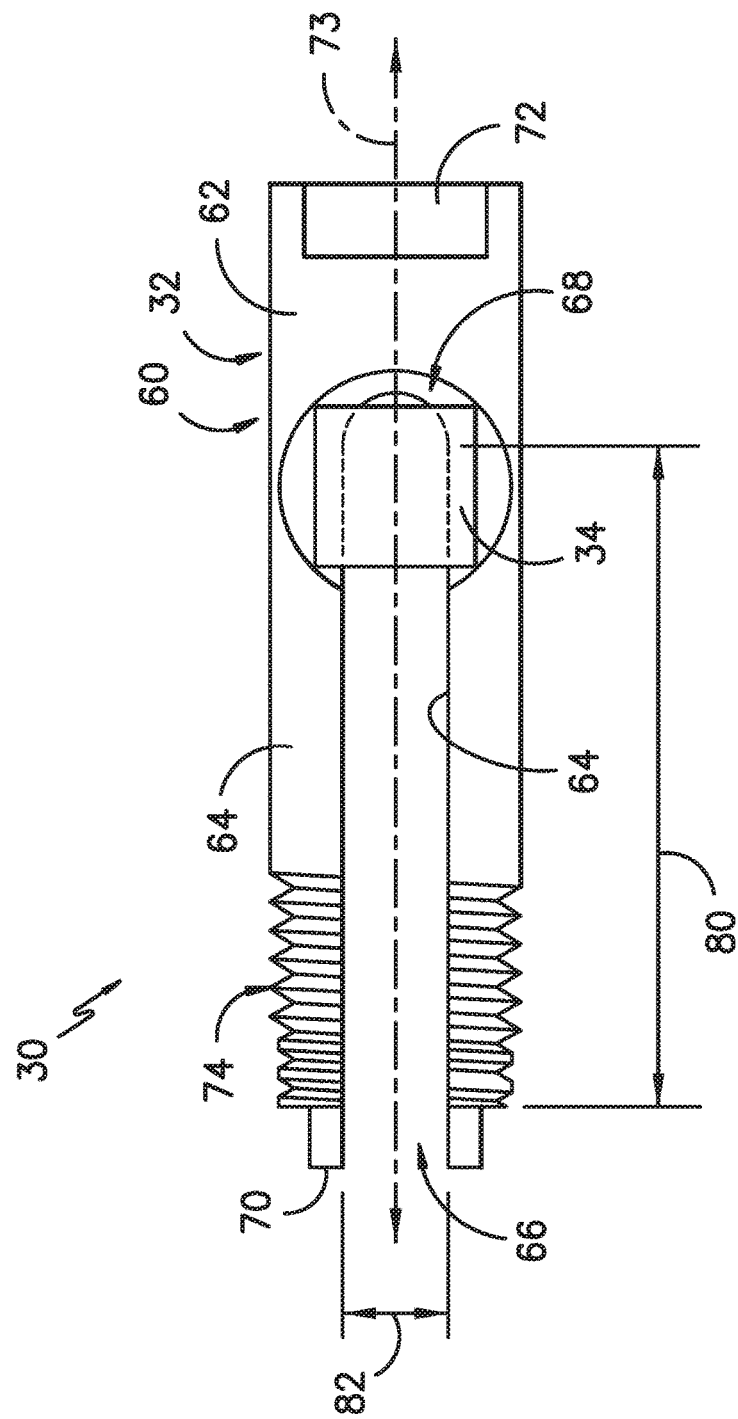
FIG. -5-

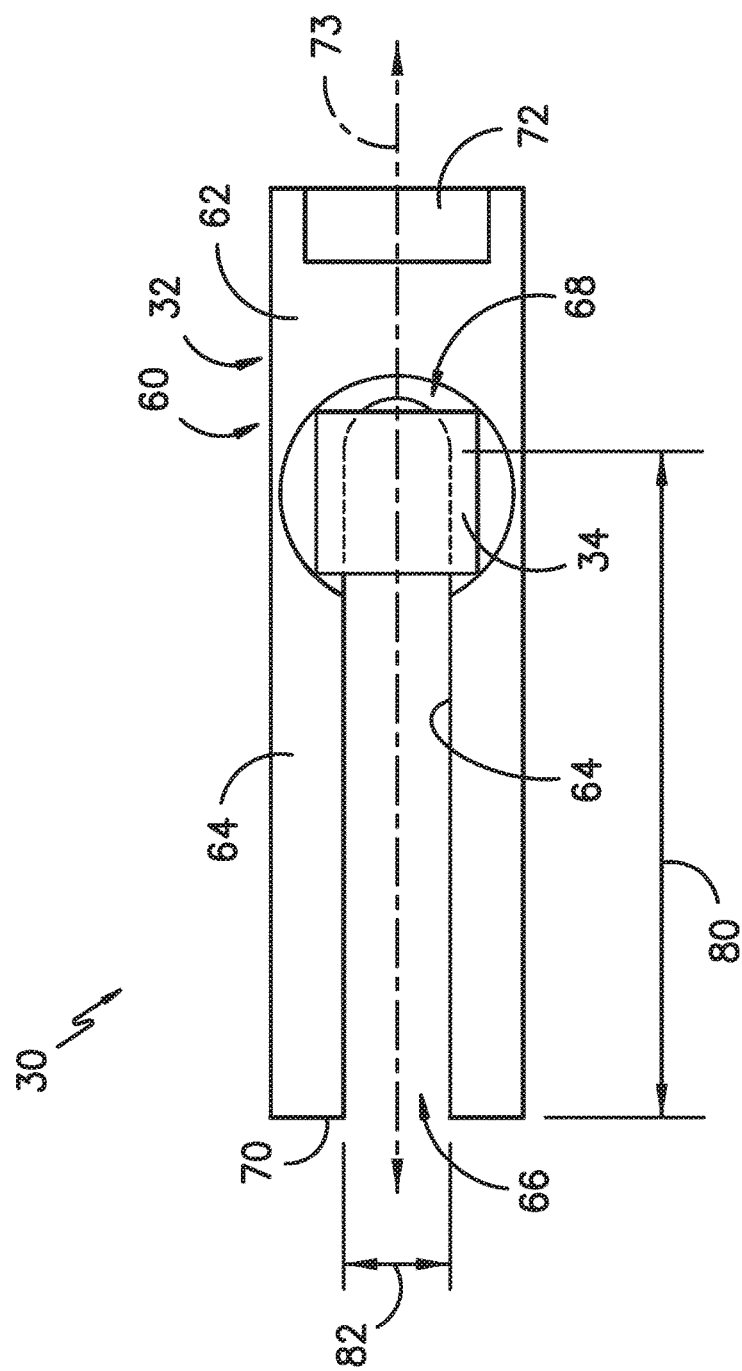
FIG. -6-

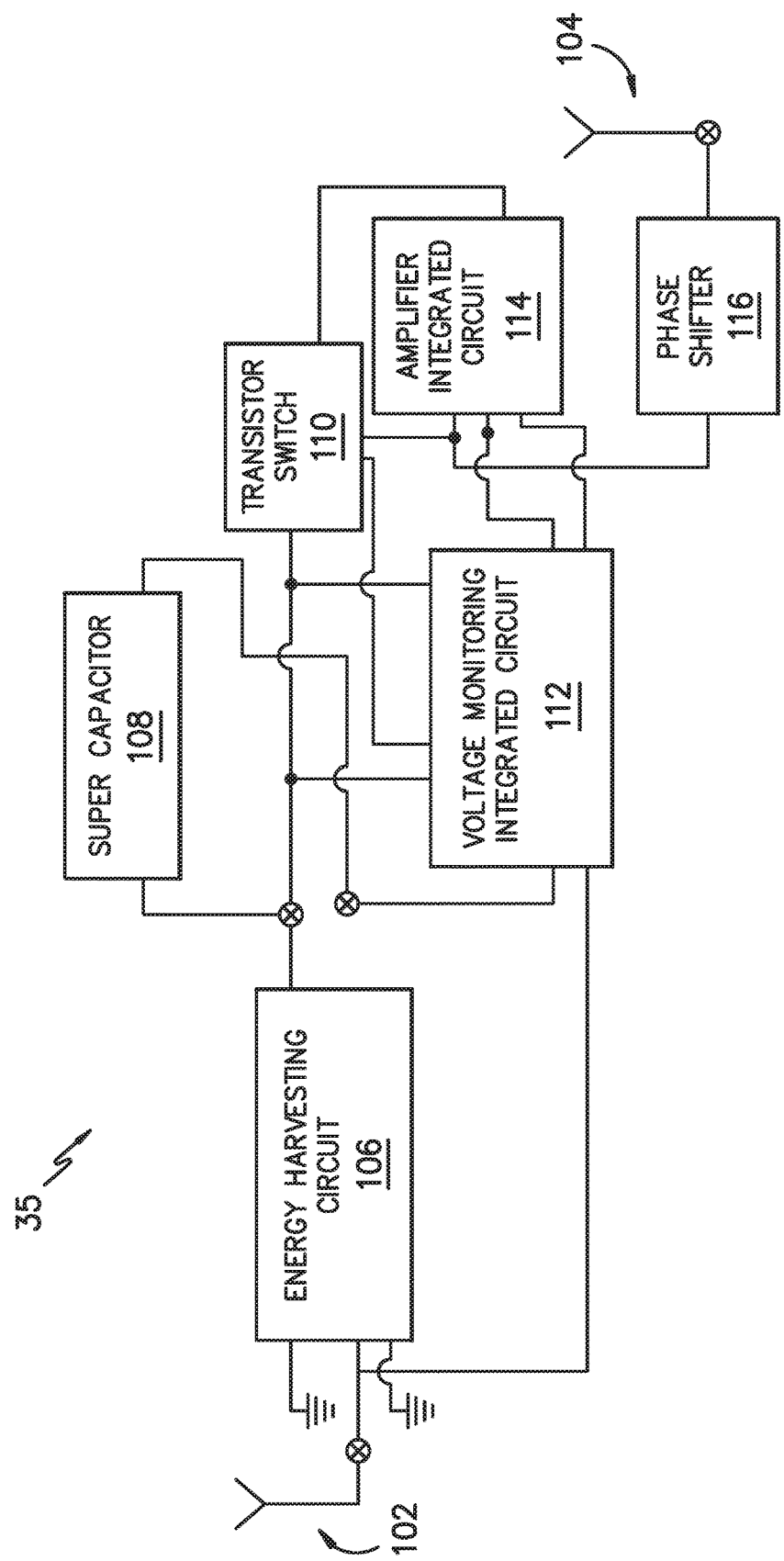
FIG. -7-

TAG CARRIERS AND ASSEMBLIES FOR RFID TAGS

PRIORITY STATEMENT

The present application is a divisional application of U.S. patent application Ser. No. 15/254,062, filed Sep. 1, 2016, which claims priority to U.S. Provisional Patent Application Ser. No. 62/213,808, filed Sep. 3, 2015, both of which are incorporated by reference herein in their entireties.

FIELD OF THE INVENTION

The present disclosure relates generally to carriers for use with radio frequency identification ("RFID") tags, as well as to apparatus which utilize such carriers.

BACKGROUND OF THE INVENTION

RFID technology is generally known, and is generally the use of electromagnetic fields to transfer data in order to, for example, identify and track associated apparatus. Typically, a signal is generated from an RFID reader, and an RFID tag can sense this signal and send a response signal, or the RFID tag can independently generate signals which can be sensed by the RFID reader. One particularly desirable application of such technology would be in the tracking of inventory or tools wherein such accountability is desired. For example, in many industries such as in the food processing industry, 100% tool accountability at the end of each shift is required. Further, in industries that utilize consumable tools, it is desirable to track individual tools and remove tools from service when they are below their service thresholds.

However, presently known RFID technology has drawbacks that prevent or restrict such desirable application. A particular drawback is the association between the size of the RFID tag and the range at which the tag can be sensed. In general, smaller tags are desirable for use with tools, etc., as the small sizes make the tags less noticeable and easier to mount in or on the individual tools. However, these smaller sizes result in reduces ranges at which the tags can be sensed, thus in many cases making use of the RFID technology impractical.

Another drawback is the attenuation in RFID signal range when an RFID tag is, for example, embedded in an associated tool, etc. Such further reduction in signal range further reduces the desirability and practicality of using RFID technology.

Accordingly, apparatus for providing improved RFID signal range would be desired. In particular, tag carriers which facilitate increased RFID signal range when utilized with RFID tags would be advantageous.

BRIEF DESCRIPTION OF THE INVENTION

Aspects and advantages of the invention will be set forth in part in the following description, or may be obvious from the description, or may be learned through practice of the invention.

Carriers and carrier assemblies for use in apparatus, such as tools, are provided. A carrier assembly generally includes a carrier and an RFID tag which may be coupled to the carrier. The carrier assembly may be inserted at least partially into a bore in an apparatus and removably coupled to the apparatus at least partially within the bore. The carrier may advantageously increase the range at which RFID signals transmitted to and/or from the RFID tag may be detected, either by the RFID tag or an RFID reader.

In some embodiments, a carrier may include a body and a sleeve. The sleeve may at least partially surround a portion of the body, and may be formed from a material which is capable of concentrating RFID signals transmitted to or by the tag, such as a suitable metal. When assembled, at least a portion of the tag may be in contact with the sleeve, such that the RFID signal transmitted to or by the tag is concentrated for receipt or transmission.

In other embodiments, the carrier may include a body which includes a base and opposing arms extending from the base. A slot may be defined between the arms. When assembled, at least a portion of the tag may be in contact with the body, such as between the arms and within the slot. The body may be formed from a material which is capable of conveying RFID signals therethrough to or from the tag, such as a suitable metal. Further, in exemplary embodiments, a length and width of the slot are particularly sized to achieve optimal RFID signal transmission.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is an exploded perspective view of an apparatus, in this case a tool, and an associated carrier assembly in accordance with one embodiment of the present disclosure;

FIG. 2 is an exploded perspective view of view of components of a carrier assembly in accordance with one embodiment of the present disclosure;

FIG. 3 is a perspective view of a carrier assembly in accordance with one embodiment of the present disclosure;

FIG. 4 is an exploded perspective view of an apparatus, in this case a tool, and an associated carrier assembly in accordance with one embodiment of the present disclosure;

FIG. 5 is a top view of a carrier assembly in accordance with one embodiment of the present disclosure;

FIG. 6 is a top view of a carrier assembly in accordance with one embodiment of the present disclosure; and FIG. 7 is a schematic view of a signal intensifier in accordance with one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 and 4, one embodiment of an apparatus which may utilize a carrier assembly in accordance with the present disclosure is provided. The apparatus as illustrated is a tool, in this case a knife 10. The knife 10 includes a handle 12 and a blade 14 extending from the handle 12, such as along a longitudinal axis 16 of the handle 12. A bore 18 may be defined in apparatus, such as in the handle 12 of the knife 10, for housing a carrier assembly as discussed herein. Bore 18 may have any suitable shape and size, and in generally may correspond to the shape and size of the associated carrier. For example, in some embodiments as shown, bore 18 may be generally tubular. Bore 18 may extend into the apparatus from an opening 19 thereof, and may extend along a longitudinal axis 16 of the apparatus or along any other suitable axis or at any suitable angle to an axis of the apparatus.

In exemplary embodiments, an internal thread(s) 20 may be provided in bore 18 for coupling the carrier to the apparatus within the bore 18. The internal thread 20 may mesh with an outer thread(s) of the carrier, as discussed herein. Additionally or alternatively, at least a portion of the bore 18 may be sized relative to the carrier such that the carrier can be press-fit into the bore 18. In general, the carrier may be removably inserted into the apparatus, such as into the bore 18 of the apparatus, and may be removably coupled to the apparatus, such as via a threaded engagement, press-fit, etc.

It should be understood that the present disclosure is not limited to the use of carriers and carrier assemblies with knifes. Rather, carriers and carrier assemblies in accordance with the present disclosure may be utilized with other suitable tools, such as hammers, screwdrivers, other suitable tools having handles, other suitable tools without handles, etc. Further the present disclosure is not limited to the use of carriers and carrier assemblies with tools, and rather may be utilized with any suitable apparatus which may, for example, require RFID tracking, such as clothing, containers for, for example, shipping other items, etc.

Referring now to FIGS. 1 through 6, various embodiments of carrier assemblies 30 in accordance with the present disclosure are provided. A carrier assembly 30 generally includes a carrier 32 and an RFID tag 34. In general, the RFID tag 34 may be coupled, such as removably coupled, to the carrier 32, and the carrier assembly 30 may be inserted, such as removably inserted into the bore 18 of an associated apparatus. A RFID reader 25 (FIGS. 1 and 4) may be utilized to transmit and/or receive signals to/from the RFID tag 34. As discussed herein, carriers 32 in accordance with the present disclosure may advantageously increase the range at which such signals can be sensed, thus facilitating use of RFID technology in various applications wherein longer range tag 34 detection is desired.

Reader 25 and tag 34 may, at a suitable range, be in signal communication with each other. In some embodiments, tag 34 is a passive RFID tag. Thus, reader 25 can receive a radio signal from tag 34 in response to a query or request signal from reader 25. In particular, tag 34 can generate or transmit a response radio signal utilizing energy transmitted, e.g., wirelessly, to tag 34 from reader 25 via the query or request signal from reader 25. Accordingly, tag 34 need not include a battery or other power source in order to generate or transmit the response radio signal. In other embodiments, tag 34 can include a battery or be connected to a suitable power source, and tag 34 can continuously or intermittently generate or transmit a signal that reader 25 can receive. As will be understood, reader 25 and tag 34 can have any other suitable setup or configuration for placing reader 25 and tag 34 in signal communication with each other. Thus, reader 25 may be passive or active, and RFID tag 34 may be passive or active as desired. Notably, one particularly suitable RFID tag 34 is the "Glint" tag available from Alien Technology®. A particular advantage of the use of carrier assemblies as discussed herein is that relatively inexpensive RFID tags 34 can be utilized, because the tags can be inserted into associated bores 18 and easily removed when desired or required via associated carriers 32, rather than having to themselves be embedded in the associated apparatus during manufacture of the apparatus, such as via molding, etc.

In some embodiments, a signal intensifier 35 (see FIGS. 1 and 2) may additionally be connected, such as physically connected or inductively coupled, to the tag 34 for boosting the signal generated by the tag 34. The signal intensifier 35 may include an antenna and suitable circuitry, including diodes and capacitors. The signal intensifier 35 may harvest "waste" radio signals in the environment. The antenna may convert these signals to electricity, which may be stored in the capacitors. In some embodiments, the circuitry may step up the voltage of this electricity before storing the electricity in the capacitors. When the tag 34 receives a signal from the reader 25, the signal intensifier 35 may also receive the signal. The signal intensifier may synchronize with the frequency of the signal and then apply an excitation signal to the tag 34 to boost the signal from the tag 34 in phase with the signal from the reader 25.

FIG. 7 illustrates one embodiment of a signal intensifier 35 which may be utilized in accordance with the present disclosure. The signal intensifier 35 may include, for example, an input antenna 102 and an output antenna 104. Input antenna 102 may receive radio signals from the environment. Output antenna 104 may be connected to tag 34.

Signal intensifier 35 may further include, for example, an energy harvesting circuit 106, which may for example be a charge pump circuit. The energy harvesting circuit 106 may, for example, include a plurality of switching diodes and capacitors. The energy harvesting circuit 106 generally uses capacitors as energy-storage elements to create either a higher- or lower-voltage power source. In the present embodiments, circuit 106 may create a higher-voltage power source.

Signal intensifier 35 may further include a super capacitor 108, a transistor switch 110, a voltage monitoring integrated circuit 112, and an amplifier integrated circuit 114. The voltage monitoring integrated circuit 114 generally monitors the voltage of the super capacitor 108, and includes a resistor network which sets a voltage reference for triggering the transistor switch 110. Signal intensifier 35 may further include a phase shifter 116, which maintains a zero degree phase shift relationship between the amplified output and the excitation signal.

Referring now to FIGS. 1 through 3, particular embodiments of carrier assembly 30 and the carrier 32 thereof are illustrated. As shown, carrier 32 includes a body 40 and a sleeve 42. Sleeve 42 generally surrounds at least a portion of the body 40. Body 40 generally extends between a first end 50 and a second end 52. A first end portion 51 includes the first end 50, a second end portion 53 includes the second end 52, and an intermediate portion 55 is disposed between the end portions 51, 53 and spaced from the ends 50, 52. An outer thread(s) 56 may be provided on the body 40, such as on, for example, second end portion 53 or first end portion 51. The outer thread 56 may threadably engage and mate with the internal thread(s) 20. When the carrier 32 is coupled to the apparatus defining the bore 18, the first end 50 may be disposed within the bore 18. Second end 52 may be disposed within the bore 18, at the opening 19, or exterior to bore 18.

Sleeve 42 may generally surround at least a portion of the body 40, such as at least a portion of the intermediate portion 55. A bore 43 may be defined by and through sleeve 42, through which intermediate portion 55 may extend. In some embodiments as illustrated in FIGS. 1 and 2, sleeve 42 may have a continuous cross-sectional shape, which may for example be circular, oval-shaped, or polygonal. Alternatively, as illustrated in FIG. 3, sleeve 42 may have a discontinuous cross-sectional shape, such as a C-shape, a discontinuous polygonal shape, etc.

Sleeve 42 is formed from a material which is capable of concentrating RFID signals transmitted to or by tag 34. For example, sleeve 42 may be formed from a suitable metal, such as steel, aluminum, tin, nickel, titanium, etc. When assembled, at least a portion of the tag 34 may be in contact with the sleeve 42, such that the RFID signal transmitted to or by the tag 34 is concentrated for receipt or transmission. Such concentration advantageously facilitates improved tag 34 sensing by reader 25 at greater distances. Tag 34 may be removably coupled to sleeve 42 (and body 40) via a suitable adhesive, a tape, or any other suitable coupling method or apparatus.

Body 40 may be formed from a different material then sleeve 42, and in exemplary embodiments is formed from a suitable plastic or other material not capable of concentrating RFID signals as discussed above. In some exemplary embodiment, for example, body 40 may be formed from a fiber impregnated polymer, which may for example be a polyamide (such as Nylon), a polymer having an acetyl group, or another suitable polymer. In exemplary embodiments, for example, carrier 32 is assembled by placing sleeve 42 in a mold and molding, such as injection molding, body 40 around sleeve 42.

Carrier 32 as shown is sized and shaped to fit within bore 18 with tag 34 coupled thereto. As discussed, in some embodiments, outer thread 56 may be utilized and may be threadably engageable to internal thread 20. Additionally or alternatively, a portion of the body 40, such as a portion of second end portion 53, may be sized and shaped to be press-fit within bore 18. The use of threads and/or a press-fit to removably couple the carrier 32 to the apparatus defining the bore 18 may advantageously provide hygienic benefits. For example, the seal between the carrier 32 and bore 18 may advantageously block or reduce the infiltration of pathogens into gaps between the carrier 32 and apparatus. To provide further hygienic benefits, the interior surface of the bore 18 (including internal thread 20) or a portion thereof and/or the exterior surface of the body 40 (including outer thread 56) or a portion thereof may have an antimicrobial coating, such as a silver ion coating, applied thereon.

In exemplary embodiments as shown, intermediate portion 55 may have a smaller cross-sectional area than first portion 51, and first portion 51 may have a smaller cross-sectional area than second portion 53. The combination of the sleeve 42 and intermediate portion 55 may have a cross-sectional area approximately equal to the cross-sectional area of the first portion 51. The bore 18 may have a cross-sectional area approximately equal to the cross-sectional area of the second portion 53. Accordingly, a tag 34 coupled to the sleeve 42 and, for example, to first portion 51 can fit along with carrier 32 within bore 18, and second portion 53 can couple the carrier assembly 30 to the apparatus defining the bore 18.

Referring now to FIGS. 4 through 6, additional embodiments of carrier 32 are illustrated, in these embodiments, carrier 32 includes a body 60 which includes a base 62 and opposing arms 64 extending therefrom. A slot 66 is defined between the arms 64. A recess 68 may be defined in the body, and the tag 34 may, when coupled to the carrier 32, be disposed within the recess 68 and at least partially within the slot 66.

As shown, body 60 may extend between a first end 70 and a second end 72, such as along a longitudinal axis 73. The base 62 may include the second end 72, and the arms 64 may include the first end 70. In some embodiments, as illustrated in FIGS. 4 and 5, an outer thread(s) 74 may be provided on the body 60, such as on, for example, the base 62 proximate the second end 72 or the arms 64 proximate the first end 70. The outer thread 74 may threadably engage and mate with the internal thread(s) 20. In alternative embodiments, as illustrated in FIG. 6, no threads may be included on the body 60, and the base 62 proximate the second end 72 and the arms 64 proximate the first end 70 may be generally smooth. When the carrier 32 is coupled to the apparatus defining the bore 18, the first end 70 may be disposed within the bore 18. Second end 72 may be disposed within the bore 18, at the opening 19, or exterior to bore 18.

Slot 66 may extend from the first end 70 generally along the longitudinal axis 73 towards the base 62, and may terminate at the base 62. Slot 66 may define and divide the arms 64. A length 80 may be defined for the slot 66, such as for the portion of the slot 66 having linear sidewalls (when viewed in a top view as shown). Further, a maximum width 82 may be defined for the slot 66 between the sidewalls of the arms 64.

Recess 68 may extend into body 60, such as generally perpendicularly to slot 66. Recess 68 may extend through a portion of the slot 66, and provide internal surfaces on which a tag 34 can be disposed within recess 68.

In these embodiments, carrier 32 may operate based on the "waveguide" principle, and may thus convey electromagnetic waves between endpoints thereof. Accordingly, body 60 may be formed from a material which is capable of conveying RFID signals therethrough to or from tag 34. For example, body 60 may be formed from a suitable metal, such as steel, aluminum, tin, nickel, titanium, etc. When assembled, at least a portion of the tag 34 may be in contact with the body 60, such as within recess 68, such that RFID signals are transmitted to or from tag 34 through the arms 64. Such design advantageously facilitates improved tag 34 sensing by reader 25 at greater distances. Tag 34 may be removably coupled to body 60 (such as within recess 68) via a suitable adhesive, a tape, or any other suitable coupling method or apparatus.

Notably, in exemplary embodiments, the length 80 and width 82 are particularly sized to achieve optimal RFID signal transmission. The present inventors have discovered that the sizing of the length 80 and width 82 are particularly correlated to optimal RFID signal transmission. For example, the transmission frequency for an RFID signal may be determined, and the peak-to-peak root mean square ("RMS") distance for that transmission frequency may be measured. The length 80 and width 82 may in exemplary embodiments each be a multiple, and in particular an integer multiple, of this distance.

Carrier 32 as shown is sized and shaped to fit within bore 18 with tag 34 coupled thereto. As discussed, in some embodiments, outer thread 74 may be utilized and may be threadably engageable to internal thread 20. Additionally or alternatively, a portion of the body 60, such as the base 62, may be sized and shaped to be press-fit within bore 18. The use of threads and/or a press-fit to removably couple the carrier 32 to the apparatus defining the bore 18 may advantageously provide hygienic benefits. For example, the seal between the carrier 32 and bore 18 may advantageously block or reduce the infiltration of pathogens into gaps between the carrier 32 and apparatus. To provide further hygienic benefits, the interior surface of the bore 18 (including thread 20) or a portion thereof and/or the exterior surface of the body 60 (including outer thread 74) or a portion thereof may have an antimicrobial coating, such as a silver ion coating, applied thereon.

Use of carrier assemblies 30 in accordance with the present disclosure provides numerous benefits. In particular, the carrier assemblies 30 and carriers 32 thereof provide for improved RFID signal transmission, thus facilitating use of RFID technology in various settings in which RFID technology was previously inadequate or undesirable. Further, such carrier assemblies 30 and carriers 32 thereof allow for removal and replacement of associated RFID tags. The carrier assemblies 30 and carriers 32 can thus advantageously be reused in multiple apparatus over a period of time as desired. Additionally, the RFID tags need not be expensive and robust, but rather can be relatively inexpensive and, for example, disposable, because the tags do not have to endure manufacturing processes such as molding that are utilized to form the associated apparatus.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A carrier assembly for use in an apparatus, the apparatus defining a bore, the carrier assembly comprising:
   a carrier, the carrier insertable at least partially into the bore and removably coupleable to the apparatus, the carrier comprising a body defining a recess, the body comprising:
      a base; and
      opposing arms extending from the base, the opposing arms defining a slot therebetween; and
   a radio frequency identification tag coupled to the carrier, the tag disposed within the recess and in contact with the body.

2. The carrier assembly of claim 1, wherein the recess extends generally perpendicularly to the slot.

3. The carrier assembly of claim 1, wherein the body is formed from a metal.

4. The carrier assembly of claim 1, wherein a length and a width of the slot are each an integer multiple of a peak-to-peak root mean square distance for a transmission frequency for a radio frequency identification signal transmitted to and from the tag.

5. The carrier assembly of claim 1, wherein an outer thread is provided on the body.

6. The carrier assembly of claim 5, wherein the outer thread is provided on the arms.

7. The carrier assembly of claim 1, wherein the tag is removably coupled to the carrier.

8. The carrier assembly of claim 1, wherein the tag is a passive tag.

9. The carrier assembly of claim 1, further comprising a signal intensifier connected to the tag.

10. A tool, the tool comprising:
    a bore defined in the tool; and
    a carrier assembly at least partially inserted into the bore, the carrier assembly comprising:
       a carrier, the carrier at least partially disposed within the bore and removably coupled to the tool, the carrier at least partially formed from a metal, the carrier comprising a body defining a recess, the body comprising, a base and opposing arms extending from the base, the opposing arms defining a slot therebetween; and
       a radio frequency identification tag coupled to the carrier, at least a portion of the tag in contact with the metal.

11. The tool of claim 10, wherein the tool comprises a handle and the bore is defined in the handle.

12. The tool of claim 10, wherein an internal thread is provided in the bore and an external thread is provided on the carrier, and wherein the external thread and internal thread mesh to removably couple the carrier to the tool.

13. The tool of claim 10, wherein the carrier assembly further comprises a signal intensifier connected to the tag.

* * * * *